United States Patent [19]
Schuller

[11] 3,835,182
[45] Sept. 10, 1974

[54] DEHYDROABIETIC ACID AND ETHYLENE REACTION PRODUCTS

[75] Inventor: Walter H. Schuller, Lake City, Fla.

[73] Assignee: The United States of America as represented by the Secretary of Agriculture, Washington, D.C.

[22] Filed: Sept. 13, 1972

[21] Appl. No.: 288,807

[52] U.S. Cl........ 260/468.5, 260/75 UA, 260/514.5
[51] Int. Cl............................................. C07c 63/46
[58] Field of Search................................ 260/514.5

[56] References Cited
OTHER PUBLICATIONS

Fujiwara, et al., "Aromatic Substitution of Olefins," (1969), JACS, 91, pp. 7166–7169.

Primary Examiner—Lorraine A. Weinberger
Assistant Examiner—Michael Shippen

[57] ABSTRACT

New compositions of matter are prepared by reacting ethylene with dehydroabietic acid (or disproportionated rosin) in the presence of palladium (II) acetate to give mixed dimeric dibasic acids.

4 Claims, No Drawings

DEHYDROABIETIC ACID AND ETHYLENE REACTION PRODUCTS

A non-exclusive, irrevocable, royalty-free license in the invention herein described throughout the world for all purposes of the United States Government, with the power to grant sublicenses for such purposes, is hereby granted to the Government of the United States of America.

This invention relates to the preparation of dibasic acids. More specifically, this invention relates to the preparation of new compositions of matter by reacting ethylene and dehydroabietic acid of the like in the presence of palladium (11) acetate or mixtures thereof. By the process of this invention mixed dimeric basic acids are obtained. These products are useful in the preparation of modified styrenated laminating polyesters.

The main object of this invention is to provide a process for the preparation of the new compositions of matter described herein utilizing palladium (11) acetate.

Another object of this invention is to provide a process for the preparation of these and other compositions of matter utilizing a mixture of palladium (11) acetate and salts such as silver acetate or cupric acetate in a solvent system containing a fatty acid such as acetic, for example, to yield rosin-based mixed dimeric dibasic acids.

In Tetrahedron Letters, 35 p 3863 (1968) and Journal of American Chemical Society, 91, p 7166 (1969), the reaction of ethylene with benzene in the presence of palladium (11) acetate is described. In the JACS article, on page 7167, it was stated that "other two-step arylation reactions have not been found in our limited work with olefins." This has reference to the reaction of the styrene initially formed in the reaction wih another mole of benzene to give stilbene. When toluene was used in place of benzene lower yields of the analogous products were obtained (ref. the Tetrahedron Letters).

In investigating the prior art it was determined that dehydroabietic acid (1) might be too heavily substituted

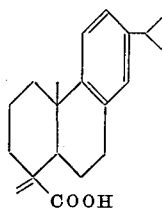

to function as an aromatic starting material for the above type of reaction (1,2,4-substituted benzene). The reaction was investigated by using a hexane-acetic acid solvent system and silver acetate in large amount to regenerate the palladium acetate, reacting dehydroabietic acid with ethylene and obtaining mixed dibasic dimeric resin acids in 62 percent yield of GLC volatile material as determined by gas liquid chromatography (GLC analysis). The total percentage GLC volatile material is 80 percent. These results were surprising and unexpected.

The GLC analyses employed in these investigations were carried out as developed for the analysis of rosin-based dimeric dibasic acids produced by the sulfuric acid catalyzed isomerization of abietic acid and various rosins, reported in Industrial & Engineering Chemistry, Product Research and Development, 9, page 60 (1970). The GLC curves of the ethylene-dehydroabietic acid reaction mixtures and the reaction mixtures from the sulfuric acid catalyzed dimerization of abietic acid were similar but not identical. Monomeric resin came off isothermally at 180°C. On subsequent programming at 30°C/minute to 360°C, the mixed dibasic-dimeric rosin based acids (as the esters) then came off of the specially prepared air oxidized silicone column.

When this investigation was repeated but employing cupric acetate in place of silver acetate a 29 percent yield of mixed dimeric dibasic acids was obtained. When a blank run was made in the absence of ethylene no appreciable amount of mixed dimeric dibasic acid was observed.

In the preparation of mixed dimeric dibasic resin acids from ethylene and dehydroabietic acid in the presence of palladium acetate and silver acetate the monomer peak consisted of essentially all unreacted dehyroabietic acid, which obviously could be recycled through the process. The catalysts also could be reworked. For example, the palladium metal is easily regenerated in essentially quantitative yield to give palladium (11) acetate upon boiling in acetic acid mixed with a small quantity of nitric acid.

Further investigative efforts were made and it was found that disproportionated or dehydrogenated rosin which contained high proportions of dehydroabietic acid could also be employed as the starting materials, rather than pure dehydroabietic acid. A method for preparing pure dehydroabietic acid or a dehydrogenated rosin containing a high proportion of dehydroabietic acid is reported in the Journal of Organic Chemistry, 31, page 426 (1966).

The yields of mixed dimeric dibasic resin acids from the reaction of ethylene and dehydroabietic acid are much higher when a mixture of hydrocarbon solvents such as n-heptane and acetic acid are used rather than when only n-heptane or only acetic acid is used as the solvent for the reaction. Higher yields of mixed dibasic dimeric resin acids can be obtained also when salts such as silver acetate are used in conjunction with palladium (11) acetate to recycle the palladium metal during the reaction; that is, higher than when palladium acetate is used alone.

Presently the mixed dimeric dibasic resin acids formed by the process of this invention are useful as modifiers for unsaturated polyester resins crosslinked with styrene to give laminating resins.

The reaction discussed hereinabove can be carried out at temperatures from about 40°C to the reflux temperature of the solvent used or the solvent mixture employed. The preferred temperature range is from about 60°C to the reflux temperature of the solvent system used.

The palladium acetate used in the hereinabove described reaction is, as is readily apparent, a reactant in the process and is used in equimolar amounts when used alone. Palladium acetate can be used in less than equimolar amounts if salts are used in conjunction with the palladium acetate, which are capable of regenerating the palladium formed to give renewed amounts of palladium acetate. Such salts are, e.g., silver acetate and cupric acetate.

The following examples are provided to illustrate the preferred techniques applicable to the process of this

EXAMPLE 1

To a solution of 6.0 g (0.02 mole) of dehydroabietic acid in 24 ml of glacial acetic acid and 100 ml of n-heptane is added 2.25 g (0.01 mole) of palladium (11) acetate and 16.69 g (0.10 mole) of silver acetate and the mixture charged to a 500 ml r.b. four-necked flask equipped with a reflux condenser terminated with a drying tube filled with Drierite desiccant, a thermometer, a gas inlet tube extending below the surface of the liquid, and a mechanical stirrer. Ethylene gas is bubbled through the dispersion during vigorous stirring under reflux (89°C) for 8 hours. The flask is heavily silvered at the end of the reaction and the brown dispersion has turned to a dark black dispersion. The solution is filtered, water washed, stripped and the brown friable solid residue is dried under reduced pressure over Drierite desiccant; yield 6.86 g; m.p. 154°–158° dec.; equiv. wt. 328. A portion is reacted with an excess of ethereal diazomethane. The methyl esters are analyzed by means of GLC, being linear temperature programmed to 360°C at 30°C/min. using an air oxidized silicone column cured in air at 350°C overnight. The yields based on dehydroabietic acid are mixed dibasic acid dimers 62 percent, methyl dehydroabietate 38 percent, calculated from the GLC volatile material. The total percent GLC volatiles is 80 percent. The yield of dimer based on palladium (11) acetate is about 100 percent. The UV on the crude ester mixture is $\lambda$ max. (95 percent ethanol) 298 $\mu$ broad (a 55), with peaks at 268 and 276 $\mu$.

The ultraviolet spectrum of the reaction product of ethylene and dehydroabietic acid confirmed the presence of stilbene type compounds [$\lambda$ max. stilbene 295 $\mu$ (a 150)]. The absence of peaks in the 240–250 $\mu$ region indicates the probable absence of any significant amount of single step arylation reaction product [$\lambda$ max. styrene 244 $\mu$ (a 212)].

EXAMPLE 2

Example 1 is repeated using cupric acetate in twice the molar amount of silver acetate used. A 29 percent yield of mixed dibasic dimeric resin acids is obtained based on GLC analyses.

EXAMPLE 3

Example 1 is repeated with the exception that no ethylene was passed through the solution. No significant amount of dimer is formed.

EXAMPLE 4

Example 1 is repeated using twice the amount of disproportionated rosin as dehydroabietic acid. The disproportionated rosin contained about 50 percent of dehydroabietic acid as determined by GLC. The disproportionated rosin is prepared according to the method described in J. Org. Chem. 31, 4246 (1966). The yield of mixed dibasic dimeric resin acids is 60 percent based on the dehydroabietic content present.

EXAMPLE 5

To 75 ml of glacial acetic acid is added 1.5 g of dehydroabietic acid (.005 mole) and 2.25 g of palladium (11) ) acetate (.01 mole) (½ mole ratio) and the mixture is charged to an apparatus as described in Example 1. Ethylene gas is bubbled through the dispersion during stirring at a liquid temperature of 100°C for 8.5 hours. A 10 ml aliquot is taken from the reaction mixture, filtered by gravity, ether added, washed with water until neutral, an excess of an ethereal solution of diazomethane added, the excess reagent blown off with nitrogen after 1.5 hours and the product is analyzed via glc according to the procedure in Example 1. The yield of dimer acids is 8.4 percent.

EXAMPLE 6

To a mixture of 30 ml of glacial acetic acid and 30 ml of n-heptane in an apparatus as described in Example 1, is added 1.5 g of dehydroabietic acid (0.005 mole) and 0.89 g of palladium (11) chloride (0.005 mole) and 0.82 g (0.01 mole) of fused, anhydrous sodium acetate. Stirring is started and the mixture heated to 90°C. Ethylene is passed into the solution at this temperature for 10 hours. A 10 ml aliquot filtered, diluted with ether, washed with water until neutral, dried over sodium sulfate, filtered, concentrated under a stream of nitrogen, an excess of ethereal diazomethane is added and allowed to stand for 1 hour, excess reagent is blown off under nitrogen stream, and the mixture is analyzed via glc as described in Example 1. The dimer acids content is found to be 10.3 percent by this method.

EXAMPLE 7

To 60 ml of glacial acetic acid in an apparatus as described in Example 1 is added 1.5 g (0.00478 mole) of methyl dehydroabietate and 1.61 g (0.0072 mole) of palladium (11) acetate. Heat and stirring is supplied and ethylene gas is passed through the mixture. The liquid temperature is held at 100°C. After 8 hours the reaction is terminated. A 10 ml aliquot is removed, filtered, diluted with ether, washed with water until neutral, excess ether blown off under nitrogen stream and residual solution analyzed via glc according to the procedure described in Example 1. The dimer acids ester content is 18.8 percent.

EXAMPLE 8

The mixed dibasic dimeric resin acids from Example 1 is used to modify a styrenated unsaturated polyester laminating resin as follows.

A 22 gram sample of the crude mixed dimeric dibasic acid reaction product from Example 1 is esterified under nitrogen with 5 grams of diethylene glycol. The rosin and gylcol are charged to the pot and heated with stirring under a blanket of nitrogen to 280°C. About one hour is required to reach 280°C. After 6.5 hours the ester has an acid number of 28. The temperature is then dropped to 190°C and fumaric acid (26 g) and diethylene glycol(25 g) are added. Hydroquinone in the amount of 0.01 percent is added and the charge heated at 190°–195°C under a light nitrogen sweep for 9 hours. A rosin modified unsaturated polyester of acid no. 26 is obtained. The polyester gave a clear solution on 25 percent dilution with styrene. A 25 percent solution in styrene has a Gardner viscosity of Z-6. A 35 percent solution has a viscosity of R. On curing between chrome plates using 1.5 percent benzoyl peroxide for 4 hours at 80°C and 2 hours at 120°C, the 25 percent dilution has a Barcol hardness of 41 and the 35 percent dilution a Barcol hardness of 45. Chemical tests on the two laminating resins are as follows:

PHYSICAL PROPERTIES OF CURED POLYESTER RESINS

| | Percentage Weight Gain | | | Barcol Hardness | | |
|---|---|---|---|---|---|---|
| 25% Styrene B.H. Start 40 | 24 Hrs. | Week | Air dried 14 days | 24 Hrs. | Week | Air dried 14 days |
| Water | 0.233 | 0.752 | 0.508 | 36 | 30 | 28 |
| 10% NaOH | 0.114 | 0.372 | 0.357 | 35 | 32 | 30 |
| 30% H$_2$SO$_4$ | 0.245 | 0.455 | 0.354 | 38 | 33 | 38 |
| 50% EtOH | 0.458 | 1.649 | 1.036 | 28 | 13 | 28 |
| Toluene | 1.220 | — | — | 18 | 0 | 0 |
| 35% Styrene B.H. Start 42 | | | | | | |
| Water | 0.231 | 0.614 | 0.471 | 41 | 38 | 38 |
| 10% NaOH | 0.171 | 0.557 | 0.342 | 40 | 38 | 38 |
| 30% H$_2$SO | 0.133 | 0.346 | 0.257 | 40 | 38 | 38 |
| 50% EtOH | 0.219 | 0.735 | 0.344 | 40 | 34 | 38 |
| Toluene | 0.045 | 0.537 | 0.431 | 43 | 33 | 42 |

We claim:

1. A mixture of dimeric dibasic acids prepared by the reaction of a dehydroabietic acid-containing resin with ethylene in a mixture of glacial acetic acid and n-heptane and catalyzed by a catalyst selected from the group consisting of palladium (11) acetate, silver acetate, and cupric acetate, or a combination of any two of these.

2. The mixed dimeric dibasic resin acid composition produced by:
   a. mixing 0.01 mole of palladium (11) acetate, 0.10 mole of silver acetate, and 0.02 mole dehydroabietic acid in a 1:4 by volume mixture of glacial acetic acid and n-heptane to obtain a 20 percent dispersion,
   b. stirring the 20 percent dispersion vigorously in a vessel equipped with reflux condenser,
   c. bubbling ethylene gas through the dispersion during the vigorous stirring under reflux for about 8 hours,
   d. separating the brown friable solid formed from the charge, and
   e. drying the solid under reduced pressure over a desiccant.

3. The mixed dimeric dibasic resin acid composition produced by:
   a. mixing 0.01 mole of palladium (11) acetate, 0.10 mole of silver acetate, and 0.04 mole of disproportionated rosin containing about 50 percent dehydroabietic acid in a 1:4 by volume mixture of glacial acetic acid and n-heptane to obtain a 40 percent dispersion,
   b. stirring the 40 percent dispersion vigorously in a vessel equipped with reflux condenser,
   c. bubbling ethylene gas through the dispersion during the vigorous stirring under reflux for about 8 hours,
   d. separating the brown friable solid formed from the charge, and
   e. drying the solid under reduced pressure over a desiccant.

4. The mixed dimeric dibasic resin acid ester composition produced by:
   a. mixing 0.0072 mole of palladium (11) acetate and 0.00478 mole methyl dehydroabietate in glacial acetic acid to obtain a 5 percent dispersion,
   b. stirring the 5 percent dispersion vigorously in a vessel equipped with reflux condenser,
   c. bubbling ethylene gas through the dispersion during the vigorous stirring and heating at 100°C for about 8 hours,
   d. separating the brown friable solid formed from the charge, and
   e. drying the solid under reduced pressure over a desiccant.

* * * * *